(12) United States Patent
Xu

(10) Patent No.: US 10,917,406 B2
(45) Date of Patent: Feb. 9, 2021

(54) ACCESS CONTROL METHOD AND SYSTEM, AND SWITCH

(71) Applicant: Huawei Technologies Co., Ltd., Shenzhen (CN)

(72) Inventor: Yibin Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 16/129,333

(22) Filed: Sep. 12, 2018

(65) Prior Publication Data

US 2019/0081946 A1    Mar. 14, 2019

(30) Foreign Application Priority Data

Sep. 13, 2017 (CN) .......................... 2017 1 0822104

(51) Int. Cl.
*H04L 29/06* (2006.01)
*H04L 12/46* (2006.01)
(Continued)

(52) U.S. Cl.
CPC ........ *H04L 63/0876* (2013.01); *H04L 12/467* (2013.01); *H04L 12/4641* (2013.01);
(Continued)

(58) Field of Classification Search
CPC ..... H04L 63/0876; H04L 63/08; H04L 63/10; H04L 12/467; H04L 49/354;
(Continued)

(56) References Cited

U.S. PATENT DOCUMENTS

| 8,443,187 | B1 | 5/2013 | Orr | |
|---|---|---|---|---|
| 8,528,071 | B1 * | 9/2013 | Kwan | .................. H04L 63/0876 726/14 |

(Continued)

FOREIGN PATENT DOCUMENTS

| CN | 1416248 A | 5/2003 |
|---|---|---|
| CN | 1486032 A | 3/2004 |
| CN | 102377568 A | 3/2012 |

OTHER PUBLICATIONS

Edward Tetz. "Cisco Networking All-in-One for Dummies" excerpt dated Aug. 4, 2016 as verified by the Internet Archive (6 pages) http://web.archive.org/web/20160804174950/https://www.dummies.com/programming/networking/cisco/how-virtual-local-area-networks-vlans-work/ (Year: 2016).*

(Continued)

*Primary Examiner* — Joseph P Hirl
*Assistant Examiner* — Thomas A Gyorfi
(74) *Attorney, Agent, or Firm* — Conley Rose, P.C.

(57) ABSTRACT

An access control method, system, and a switch, pertains to the field of network technologies. The access control method includes receiving, by an authentication device, a packet from an access device, where the packet includes a virtual local area network (VLAN) identifier, and authenticating, by the authentication device based on the VLAN identifier and a preconfigured correspondence using an authentication method corresponding to the VLAN identifier, a terminal device sending the packet, where the correspondence includes a mapping from a plurality of VLAN identifiers to at least two authentication methods. Hence, the authentication method of the terminal device is determined based on the VLAN identifier such that different authentication methods may be used for terminal devices in different VLANs. Therefore, an access manner is flexible.

20 Claims, 3 Drawing Sheets

(51) Int. Cl.
*H04L 12/931* (2013.01)
*H04L 29/08* (2006.01)
*H04L 29/12* (2006.01)
*H04W 12/08* (2021.01)
*H04W 12/06* (2021.01)

(52) U.S. Cl.
CPC ............ *H04L 49/354* (2013.01); *H04L 63/08* (2013.01); *H04L 63/10* (2013.01); *H04L 61/103* (2013.01); *H04L 67/02* (2013.01); *H04W 12/06* (2013.01); *H04W 12/08* (2013.01)

(58) Field of Classification Search
CPC ... H04L 12/4641; H04L 67/02; H04L 61/103; H04W 12/08; H04W 12/06
See application file for complete search history.

(56) References Cited

U.S. PATENT DOCUMENTS

| | | | |
|---|---|---|---|
| 2006/0190721 A1* | 8/2006 | Kawakami | |
| 2008/0028445 A1* | 1/2008 | Dubuc | H04L 63/08 726/5 |
| 2009/0183252 A1* | 7/2009 | Nomi | H04L 63/08 726/13 |
| 2009/0307751 A1 | 12/2009 | Lin et al. | |
| 2012/0054358 A1* | 3/2012 | Yamada | H04L 12/4625 709/229 |
| 2013/0121321 A1 | 5/2013 | Backes | |
| 2014/0259147 A1* | 9/2014 | L'Heureux | H04L 63/083 726/14 |
| 2015/0089592 A1* | 3/2015 | Han | H04L 61/203 726/4 |
| 2015/0319615 A1* | 11/2015 | E | H04W 48/02 726/4 |
| 2016/0094557 A1* | 3/2016 | Kadur | H04L 63/0884 726/3 |

OTHER PUBLICATIONS

"Port-Based Network Access Control," IEEE Computer Society, IEEE Std 802.1X, Feb. 5, 2010, 222 pages.
Foreign Communication From a Counterpart Application, European Application No. 18194005.7, Extended European Search Report dated Dec. 10, 2018, 8 pages.

* cited by examiner

ACCESS CONTROL METHOD AND SYSTEM, AND SWITCH

TECHNICAL FIELD

This application claims priority to Chinese Patent Application No. 201710822104.4 filed on Sep. 13, 2017, which is hereby incorporated by reference in its entirety.

TECHNICAL FIELD

This application relates to the field of network security technologies, in particular, to an access control method, apparatus, and system, and a switch.

BACKGROUND

A terminal device can access a network only after identity authentication is successful. Common identity authentication methods include the Institute of Electrical and Electronics Engineers (IEEE) 802.1X authentication, Media Access Control (MAC) authentication, and captive portal authentication (also referred to as web authentication). For the IEEE 802.1X authentication, the terminal device needs to install client software and initiate an authentication process using the client software. The MAC authentication is based on a MAC address, and a terminal device using a MAC address in a white list passes the MAC authentication. The captive portal authentication is based on a Hypertext Transfer Protocol (HTTP) or HTTP over Secure Socket Layer (HTTPS) request sent by a terminal device.

Currently, an authentication method is selected based on a physical port of an authentication device. The authentication method is monotonous.

SUMMARY

In order to resolve a problem of a monotonous authentication method of an authentication device, this application provides an access control method, apparatus, and system, and a switch. The technical solutions are as follows.

According to a first aspect, an access control method is provided, where the method includes receiving, by an authentication device, a packet sent by an access device, where the packet includes a virtual local area network (VLAN) identifier, and authenticating, by the authentication device, based on the VLAN identifier in the packet and a preconfigured correspondence using an authentication method corresponding to the VLAN identifier, a terminal device that sends the packet, where the correspondence includes a mapping from a plurality of VLAN identifiers to at least two authentication methods.

Authentication methods for terminal devices that belong to different VLANs are determined based on VLAN identifiers such that different authentication methods can be used for the terminal devices in the different VLANs. Therefore, an access manner is more flexible.

Optionally, the correspondence may further include a mapping from a port, connected to the access device, of the authentication device to the plurality of VLAN identifiers. Correspondingly, authenticating, by the authentication device, based on the VLAN identifier and a preconfigured correspondence using an authentication method corresponding to the VLAN identifier, a terminal device that sends the packet includes authenticating, by the authentication device, using the authentication method corresponding to the VLAN identifier, the terminal device that sends the packet when the packet is received from the port. On different ports, different authentication methods may be configured for different VLANs, and therefore configuration is more flexible.

In a possible implementation of the first aspect, authenticating, by the authentication device, using the authentication method corresponding to the VLAN identifier, the terminal device that sends the packet includes initiating, by the authentication device, MAC authentication when the authentication method corresponding to the VLAN identifier is MAC authentication and the packet is a first-specified-type packet, where the first-specified-type packet may include an Address Resolution Protocol (ARP) packet, a Dynamic Host Configuration Protocol (DHCP) packet, or the like.

In another possible implementation of the first aspect, authenticating, by the authentication device, using the authentication method corresponding to the VLAN identifier, the terminal device that sends the packet includes initiating, by the authentication device, captive portal authentication when the authentication method corresponding to the VLAN identifier is captive portal authentication and the packet is a second-specified-type packet, where the second-specified-type packet may be an HTTP request packet or an HTTPS request packet.

Optionally, the method may further include obtaining and storing, by the authentication device, the correspondence.

According to a second aspect, an access control apparatus is provided, where the apparatus includes a module configured to implement the method in the first aspect, such as a receiving module and an authentication module.

According to a third aspect, a switch is provided, where the switch includes a processor, a port, and a memory, the port and the memory are separately connected to the processor, and the processor is configured to receive, using the port, a packet sent by an access device, where the packet includes a VLAN identifier, and authenticate, based on the VLAN identifier in the packet and a preconfigured correspondence using an authentication method corresponding to the VLAN identifier, a terminal device that sends the packet, where the correspondence includes a mapping from a plurality of VLAN identifiers to at least two authentication methods.

According to a fourth aspect, a computer-readable storage medium is provided, where the computer-readable storage medium stores an instruction, and when the instruction runs on a computer, the computer executes the method according to any one of the first aspect or implementations of the first aspect.

According to a fifth aspect, a computer program product including an instruction is provided, where the instruction runs on a computer, the computer executes the method according to any one of the first aspect or implementations of the first aspect.

According to a sixth aspect, an access control system is provided, where the system includes an access device and an authentication device, the access device is configured to receive a packet sent by a terminal device, add a VLAN identifier to the received packet, and send the packet added with the VLAN identifier to the authentication device, where the authentication device is configured to execute the method according to any one possible implementation of the first aspect.

DESCRIPTION OF EMBODIMENTS

To make the objectives, technical solutions, and advantages of this application clearer, the following further describes the implementations of this application in detail with reference to the accompanying drawings.

Figure 1:
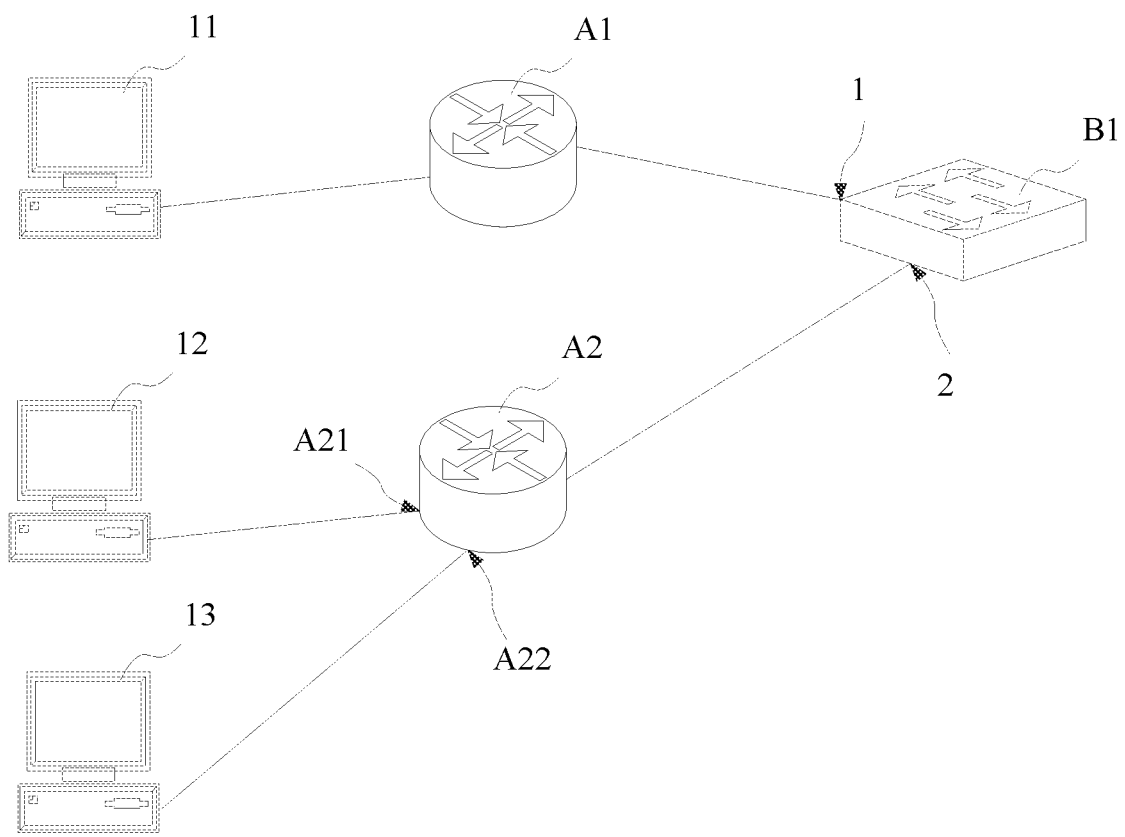
FIG. 1 is a schematic diagram of an application scenario according to an embodiment of the present disclosure.

FIG. 1 shows an application scenario according to an embodiment of the present disclosure. As shown in FIG. 1, access devices A1 and A2 are separately connected to a port of an authentication device B1. To be specific, the access device A1 is connected to a port 1 of the authentication device B1, and the access device A2 is connected to a port 2 of the authentication device B1. A terminal device 11 is connected to the access device A1, and the access device A1 is configured to allow all terminal devices that access the access device A1 using all ports of the access device A1 to access a VLAN1. A terminal device 12 is connected to the access device A2 using a first port A21 of the access device A2, and a terminal device 13 is connected to the access device A2 using a second port A22 of the access device A2. The access device A2 is configured to allow all terminal devices that access the access device A2 using the first port A21 of the access device A2 to access a VLAN2, and the access device A2 is configured to allow all terminal devices that access the access device A2 using the second port A22 of the access device A2 to access a VLAN3.

A quantity of access devices in FIG. 1 may be set depending on an actual requirement, not limited to the two shown in FIG. 1, and a quantity of terminal devices connected to each access device may vary depending on an actual requirement. A scenario shown in FIG. 1 may be applied to the following. A plurality of enterprises are in a same campus, a network in the campus is constructed in a centralized manner, and different enterprises access the network using different access devices or different physical ports of a same access device.

In FIG. 1, the terminal device may be a mobile phone, a notebook computer, a personal computer, or the like. The access device may be a switch that the terminal device is directly connected to when accessing a network and that has no authentication function. An authentication device may also be a switch providing an authentication function. The access device is connected to the authentication device, and the access device sends, to the authentication device, a packet sent by the terminal device such that the authentication device performs authentication on the terminal device or forwards the packet.

Further, a default VLAN identifier is configured for a port, connected to the terminal device, of the access device, and may be referred to as a port VLAN identifier (also referred to as port VLAN ID). When receiving a packet from the port connected to the terminal device, the access device adds the default VLAN identifier of the port to the packet, and sends the packet added with the VLAN identifier to the authentication device. For example, in FIG. 1, the terminal device 11 sends a packet to the access device A1, and the access device A1 receives the packet, adds a VLAN identifier of the VLAN1 to the packet, and then sends the packet carrying VLAN1 to the authentication device B1. For another example, in FIG. 1, the terminal device 12 sends a packet to the access device A2 using the first port A21 (whose corresponding port VLAN identifier is VLAN2), and the access device A2 receives the packet, adds the VLAN identifier of the VLAN2 to the packet, and then sends the packet carrying VLAN2 to the authentication device B1, the terminal device 13 sends a packet to the access device A2 using the second port A22 (whose corresponding port VLAN identifier is VLAN3), and the access device A2 receives the packet, adds a VLAN identifier of the VLAN3 to the packet, and then sends the packet carrying VLAN3 to the authentication device B1. After receiving the packet added with the VLAN identifier, the authentication device B1 authenticates, based on the VLAN identifier in the packet, the terminal device that sends the packet in order to implement access control over the terminal device.

In this embodiment of this application, at least two authentication methods are configured on the authentication device. An example in which two authentication methods are configured and the two authentication methods are MAC authentication and captive portal authentication is used in the following to describe this embodiment of this application.

Figure 2:
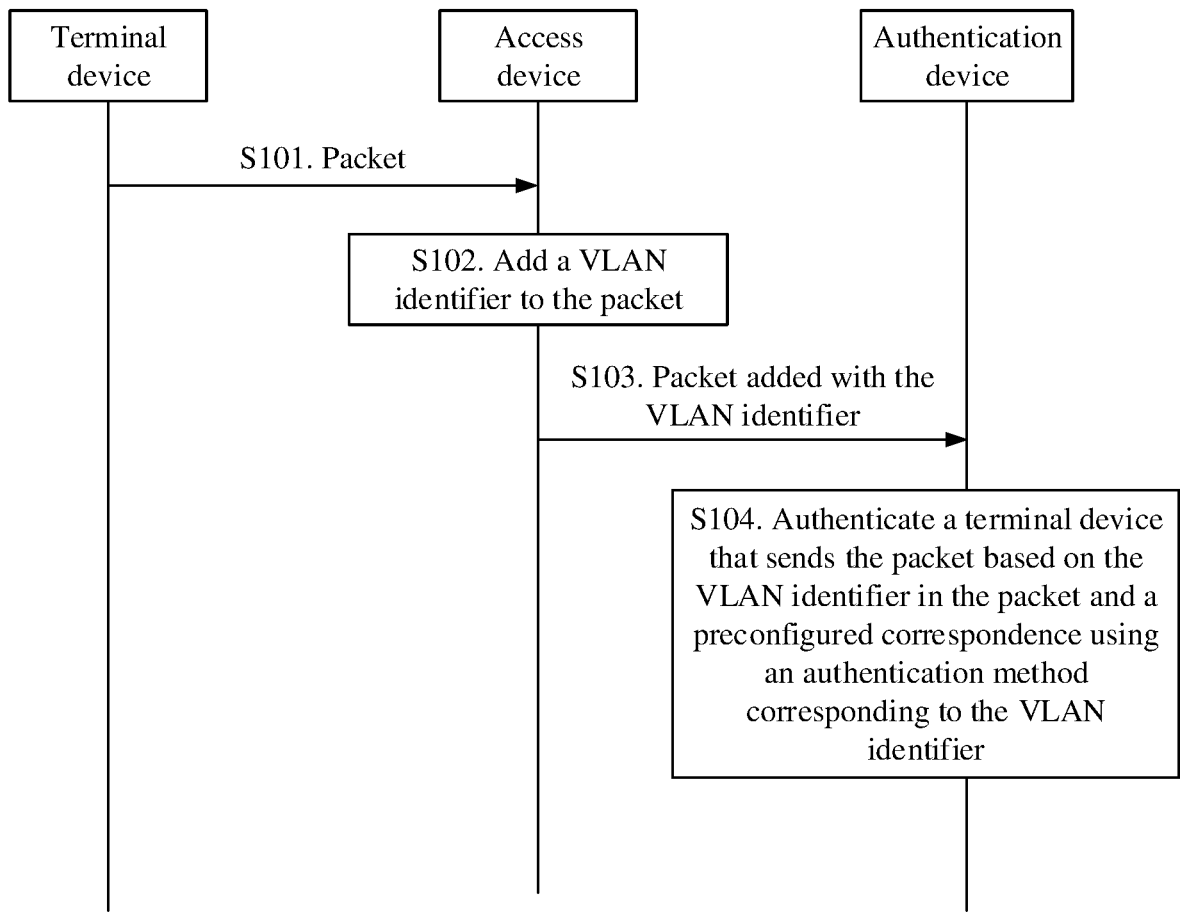
FIG. 2 is a flowchart of an access control method according to an embodiment of the present disclosure.

The following describes in detail an entire access control method with reference to FIG. 2. As shown in FIG. 2, the access control method provided in this embodiment of the present disclosure may include the following steps.

Step S101: A terminal device sends a packet to an access device.

Correspondingly, the access device receives the packet. The packet includes at least a source MAC address, and the source MAC address is a MAC address of the terminal device.

Step S102: The access device adds a VLAN identifier to the packet.

Step S102 may include: The access device determines a port receiving the packet and adds a VLAN identifier corresponding to the port (namely, the aforementioned port VLAN identifier) to the packet.

Step S103: The access device sends the packet added with the VLAN identifier to an authentication device.

Correspondingly, the authentication device receives the packet carrying the VLAN identifier.

Step S104: The authentication device authenticates, based on the VLAN identifier in the packet and a preconfigured correspondence using an authentication method corresponding to the VLAN identifier, the terminal device that sends the packet.

In an implementation of this embodiment, the correspondence may include a mapping from a plurality of VLAN identifiers to at least two authentication methods. Different VLAN identifiers may be mapped to a same authentication method or may be mapped to different authentication methods. In other words, each authentication method may be corresponding to one or more VLAN identifiers. The correspondence may be stored in a table form.

In step S104, authenticating, using the authentication method corresponding to the VLAN identifier, the terminal device that sends the packet may include that the authentication device initiates MAC authentication when the authentication method corresponding to the VLAN identifier is MAC authentication and the packet is a first-specified-type packet. The first-type packet may include an ARP packet, a DHCP packet, or the like. For example, for the ARP packet, a packet type may be determined based on a value of an Ethertype field in a physical frame header of the packet. For example, if the value of the field is 0x0806, a corresponding packet is an ARP packet.

Further, step S104 may be implemented in the following manner. When the authentication method corresponding to the VLAN identifier is MAC authentication, the authentication device determines whether the packet is a first-specified-type packet, and when the packet is a first-specified-type packet, the authentication device extracts the source MAC address from the packet, and sends the extracted source MAC address to a server for MAC authentication or performs local authentication on the extracted source MAC address, or when the packet is not a first-specified-type packet, normally forwards the packet.

In another embodiment, the authentication device may also directly obtain the source MAC address from the packet and determine whether the obtained source MAC address is a new MAC address, and when the source MAC address is a new MAC address, performs MAC authentication on the obtained source MAC address, or when the source MAC address is not a new MAC address, normally forwards the packet. Further, determining whether the obtained source MAC address is a new MAC address may be querying whether the MAC address exists in a MAC table. If the MAC address does not exist in the MAC table, the source MAC address is considered as a new MAC address.

In this embodiment, determining the packet type of the packet to determine whether the MAC address of the packet is a new MAC address can simplify a process.

Optionally, in step S104, authenticating, using the authentication method corresponding to the VLAN identifier, the terminal device that sends the packet may also include that the authentication device initiates captive portal authentication when the authentication method corresponding to the VLAN identifier is captive portal authentication and the packet is a second-specified-type packet. The second-type packet may be an HTTP request packet or an HTTPS request packet.

Further, step S104 may be implemented in the following manner. When the authentication method corresponding to the VLAN identifier is captive portal authentication, the authentication device determines whether the packet is a second-specified-type packet. When the packet is a second-specified-type packet, the authentication device sends a redirection uniform resource locator (URL) to the terminal device, where the URL points to an address of a portal server. Then, the terminal device opens the redirection URL to open a web authentication page and obtain authentication information (such as a user name and a password) that is input by a terminal user on the web authentication page, and sends obtained web authentication information to the server for authentication or performs local authentication on the obtained user name and password. When the packet is not a second-specified-type packet, the packet is normally forwarded.

The aforementioned server may be a Remote Authentication Dial-In User Service (RADIUS) server.

In another implementation of this embodiment, in addition to the mapping from the plurality of VLAN identifiers to the at least two authentication methods, the correspondence also includes a mapping from a port, connected to the access device, of the authentication device to the plurality of VLAN identifiers. One port of the authentication device may be mapped to one or more VLAN identifiers. Different ports of the authentication device may be corresponding to a same quantity of VLAN identifiers or different quantities of VLAN identifiers. Different ports of the authentication device may be corresponding to different VLAN identifiers. For example, in FIG. 1, a port 1 of the authentication device B1 is corresponding to one VLAN identifier, namely VLAN1, and a port 2 of the authentication device B1 is corresponding to two VLAN identifiers, namely VLAN2 and VLAN3. The correspondence may also be stored in a table form.

Correspondingly, step S104 may include that when the packet is received from the port, connected to the access device, of the authentication device, the authentication device authenticates, using the authentication method corresponding to the VLAN identifier, the terminal device that sends the packet. For example, when the packet is received from the port 1 of the authentication device B1 and the VLAN identifier carried in the packet is VLAN1, the authentication device B1 performs authentication using an authentication method corresponding to VLAN1. When the packet is received from the port 2 of the authentication device B1 and the VLAN identifier carried in the packet is VLAN2, the authentication device B1 performs authentication using an authentication method corresponding to VLAN2.

The authentication device in this embodiment of this application may be a network switch. The network switch may not be a gateway device. When the network switch is not a gateway device, the packet is forwarded using a layer 2.

In an implementation of this embodiment of the present disclosure, for a terminal device that is authenticated successfully, the authentication device may deliver authorization information to the access device, where the authorization information is used to indicate network access permission of the terminal device, and controls the network access permission of the terminal device based on the authorization information. For a terminal device that fails to be authenticated, the access device may isolate the terminal device.

Optionally, when the terminal device is authenticated successfully, the access control method in this embodiment may further include the following.

The terminal device may report security status information of the terminal device to a security policy server, such as a virus library version, an operating system version, or an installed patch version, the security policy server delivers authorization information to the access device based on the security status information of the terminal device, and the access device modifies the network access permission of the terminal device based on the authorization information delivered by the security policy server.

Correspondingly, the terminal device may access a software server to perform processing, such as client download, system repair, patch/virus library upgrade, until an enterprise security standard is met.

Figure 3:
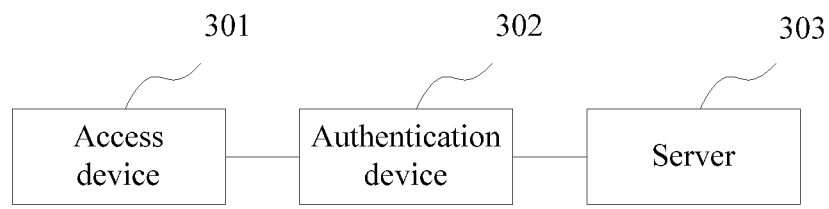
FIG. 3 is a schematic diagram of an access control system according to an embodiment of the present disclosure.

FIG. 3 is a schematic diagram of an access control system according to an embodiment of the present disclosure. As shown in FIG. 3, the access control system provided in this embodiment of the present disclosure includes an access device 301 and an authentication device 302. The access device 301 is configured to perform the steps that are performed by the access device in the method shown in FIG. 2, and the authentication device 302 is configured to perform the steps that are performed by the authentication device in the method shown in FIG. 2.

Optionally, the access control system may also include a server 303. The server 303 may include a portal server, a RADIUS server, and so on.

Figure 4:
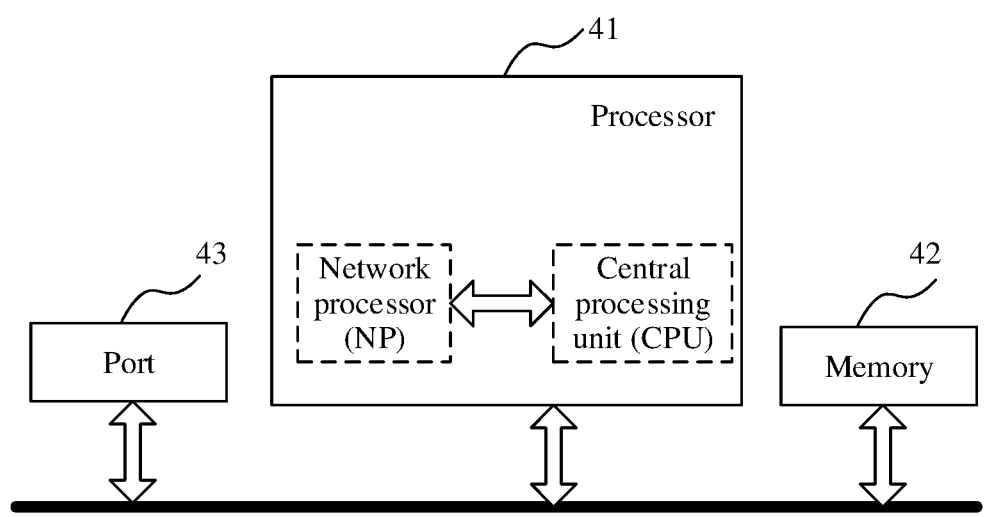
FIG. 4 is a schematic structural diagram of a switch according to an embodiment of the present disclosure.

FIG. 4 shows a structural block diagram of a switch according to an embodiment of the present disclosure.

Referring to FIG. 4, hardware of the switch may include a processor 41 with one or more processing cores, a memory 42 including one or more computer-readable storage mediums, a port 43, and the like, and the processor 41 may be connected to the memory 42 and the port 43 using a bus. A person skilled in the art may understand that a structure shown in FIG. 4 does not constitute any limitation to the switch, and may include more or fewer parts than those shown in the figure, or a combination of some parts, or parts disposed differently.

Optionally, the processor 41 may include one or more processing modules, and the processing module may be a central processing unit (CPU), a network processor (NP), or the like.

The port 43 may be an Ethernet port. The port 43 is controlled by the processor 41.

The memory 42 may be configured to store various data, such as various configuration parameters (for example, the aforementioned correspondence) and a computer instruction. The computer instruction may be executed by the processor 41. The memory 42 may include a high-speed random access memory (RAM), and may further include a non-volatile memory, for example, at least one magnetic disk, a flash memory, or another volatile solid-state storage device. Correspondingly, the memory 42 may further include a memory controller, to support access to the memory 42 by the processor 41.

In this embodiment of this application, the processor 41 is configured to receive, using the port 43, a packet sent by the access device, and is configured to execute an instruction in the memory to implement the steps that need to be performed by the authentication device shown in FIG. 2.

Figure 5:
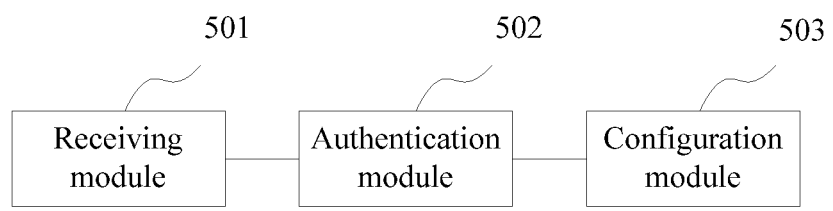
FIG. 5 is a schematic diagram of an access control apparatus according to an embodiment of the present disclosure.

An embodiment of the present disclosure further provides an access control apparatus. Referring to FIG. 5, the access control apparatus includes a receiving module 501 and an authentication module 502. The receiving module 501 is configured to receive a packet sent by an access device, where the packet includes a VLAN identifier, and the authentication module 502 is configured to authenticate, based on the VLAN identifier and a preconfigured correspondence using an authentication method corresponding to the VLAN identifier, a terminal device that sends the packet, where the correspondence includes a mapping from a plurality of VLAN identifiers to at least two authentication methods.

Optionally, the correspondence may further include a mapping from a port, connected to the access device, of an authentication device to the plurality of VLAN identifiers. Optionally, the authentication module 502 is configured to, when the packet is received from the port, authenticate, using the authentication method corresponding to the VLAN identifier, the terminal device that sends the packet.

In an implementation of this embodiment of the present disclosure, the authentication module 502 is configured to initiate MAC authentication when the authentication method corresponding to the VLAN identifier is MAC authentication and the packet is a first-specified-type packet.

In another implementation of this embodiment of the present disclosure, the authentication module 502 is configured to initiate captive portal authentication when the authentication method corresponding to the VLAN identifier is captive portal authentication and the packet is a second-specified-type packet.

Optionally, the access control apparatus may further include a configuration module 503, where the configuration module 503 is configured to obtain and store the aforementioned correspondence.

For related details, refer to the method embodiment of FIG. 2.

The authentication module 502 and the configuration module 503 may be implemented by a processor or by executing a program instruction in a memory by a processor. The receiving module 501 may be implemented by a port or by a port and a processor.

It should be noted that the embodiments of the access control apparatus and the access control method provided by the foregoing embodiments belong to a same conception. For a specific implementation process thereof, refer to the method embodiment. Details are not described again herein.

All or some of the foregoing embodiments may be implemented by means of software, hardware, or a combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, a twisted pair, and an optical fiber) or wireless (for example, infrared, microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, a semiconductor medium (for example, a solid-state drive (SSD)), or the like.

The foregoing descriptions are merely optional embodiments of this application, but are not intended to limit this application. Any modification or improvement made should fall within the protection scope of this application.

What is claimed is:

1. An access control method, comprising:
   receiving, by an authentication device, a packet from an access device, wherein the packet comprises a virtual local area network (VLAN) identifier; and
   setting, by the authentication device, an authentication method based on the VLAN identifier and a correspondence to authenticate a terminal device that sends the packet, wherein the correspondence comprises a mapping from a plurality of VLAN identifiers to at least two authentication methods, and wherein the authentication method corresponds to the VLAN identifier.

2. The method of claim 1, wherein the correspondence further comprises a mapping from a port, coupled to the access device, of the authentication device to the VLAN identifiers, and wherein setting the authentication method comprises setting, by the authentication device, the authentication method when the packet is received from the port.

3. The method of claim 1, wherein setting the authentication method comprises initiating, by the authentication device, Media Access Control (MAC) authentication when the authentication method comprises the MAC authentication and the packet comprises a first-specified-type packet, and wherein the first-specified-type packet comprises an Address Resolution Protocol (ARP) packet.

4. The method of claim 1, wherein setting the authentication method comprises initiating, by the authentication device, Media Access Control (MAC) authentication when the authentication method comprises the MAC authentication and the packet comprises a first-specified-type packet, and wherein the first-specified-type packet comprises a Dynamic Host Configuration Protocol (DHCP) packet.

5. The method of claim 1, wherein setting the authentication method comprises initiating, by the authentication device, captive portal authentication when the authentication method comprises the captive portal authentication and the packet comprises a second-specified-type packet, and wherein the second-specified-type packet comprises a Hypertext Transfer Protocol (HTTP) request packet.

6. The method of claim 1, wherein setting the authentication method comprises initiating, by the authentication device, captive portal authentication when the authentication method comprises the captive portal authentication and the packet comprises a second-specified-type packet, and wherein the second-specified-type packet comprises a Hypertext Transfer Protocol over Secure Socket Layer (HTTPS) request packet.

7. The method of claim 1, further comprising transmitting authorization information to the terminal device when the authentication method is completed successfully.

8. The method of claim 1, further comprising transmitting a redirection URL to the terminal device when the authentication method comprises captive portal authentication.

9. A switch, comprising:
a plurality of ports; and
a processor coupled to the ports and configured to:
receive, using one of the ports, a packet from an access device, wherein the packet comprises a virtual local area network (VLAN) identifier; and
set an authentication method based on the VLAN identifier and a correspondence to authenticate a terminal device sending the packet, wherein the correspondence comprises a mapping from a plurality of VLAN identifiers to at least two authentication methods, and wherein the authentication method corresponds to the VLAN identifier.

10. The switch of claim 9, wherein the correspondence further comprises a mapping from a port, coupled to the access device, to the VLAN identifiers, and wherein the processor is further configured to set the authentication method when the packet is received from the port.

11. The switch of claim 9, wherein the processor is further configured to initiate Media Access Control (MAC) authentication when the authentication method comprises the MAC authentication and the packet comprises a first-specified-type packet.

12. The switch of claim 11, wherein the first-specified-type packet comprises an Address Resolution Protocol (ARP) packet.

13. The switch of claim 11, wherein the first-specified-type packet comprises a Dynamic Host Configuration Protocol (DHCP) packet.

14. The switch of claim 9, wherein the processor is further configured to initiate captive portal authentication when the authentication method comprises the captive portal authentication and the packet comprises a second-specified-type packet.

15. The switch of claim 14, wherein the second-specified-type packet comprises a Hypertext Transfer Protocol (HTTP) request packet.

16. The switch of claim 14, wherein the second-specified-type packet comprises a Hypertext Transfer Protocol over Secure Socket Layer (HTTPS) request packet.

17. The switch of claim 14, wherein the processor is further configured to transmit a redirection URL to the terminal device when the authentication method comprises the captive portal authentication.

18. An access control system, comprising:
an access device configured to:
receive a packet from a terminal device; and
add a virtual local area network (VLAN) identifier to the packet, wherein the VLAN identifier comprises an identifier of a VLAN to which the terminal device belongs; and
an authentication device coupled to the access device and configured to set an authentication method based on the VLAN identifier and a correspondence to authenticate the terminal device, wherein the correspondence comprises a mapping from a plurality of VLAN identifiers to at least two authentication methods, and wherein the authentication method corresponds to the VLAN identifier.

19. The access control system of claim 18, wherein the correspondence further comprises a mapping from a port, coupled to the access device, of the authentication device to the VLAN identifiers, and wherein the authentication device is further configured to set the authentication method when the packet is received from the port.

20. The access control system of claim 18, wherein the system further comprises a server coupled to the access device and the authentication device and configured to cooperate with the authentication device to authenticate the terminal device.

* * * * *